H. G. ROUNDS.
LEVELING DEVICE.
APPLICATION FILED MAR. 6, 1915.

1,215,711.

Patented Feb. 13, 1917.

WITNESSES:
J. E. Grimes.
Nellie M. Angus

Herbert G. Rounds INVENTOR

BY
Geo. B. Willey ATTORNEY

UNITED STATES PATENT OFFICE.

HERBERT G. ROUNDS, OF BAY CITY, MICHIGAN.

LEVELING DEVICE.

1,215,711.  Specification of Letters Patent.  Patented Feb. 13, 1917.

Application filed March 6, 1915. Serial No. 12,535.

*To all whom it may concern:*

Be it known that I, HERBERT G. ROUNDS, a citizen of the United States, residing at Bay City, in the county of Bay and State of Michigan, have invented certain new and useful Improvements in Leveling Devices; and I do hereby declare the following to be a full, clear, and exact description of the invention, such as will enable others skilled in the art to which it appertains to make and use the same.

This invention relates to leveling devices and pertains more particularly to that class of leveling devices in which a spirit level is employed, the spirit level being adapted to be suspended from a line stretched between two points, of which the elevation of one is to be determined with relation to the elevation of the other.

My invention has for its objects—first, to provide a simple, compact and inexpensive leveling device consisting of a spirit level, a line or cord, means for suspending the level from the cord, and a receptacle for the level when not in use, the receptacle serving also as a bobbin or spool on which to wind the cord when the level is not in use.

Second, to provide means for accurately balancing the spirit level so that its center of gravity shall lie in a vertical plane passing through the center of the bubble when the level is horizontal.

Third, to provide suspending devices by which the spirit level is connected to the cord, the said suspending devices having means for adjusting the ends of the level up and down, whereby correct parallelism may be established between the central axis of the leveling tube and the axis of the cord.

Fourth, to arrange the holder in which the leveling tube is mounted, so that the side of the tube as well as its top will be exposed to view throughout a considerable length of the tube, whereby, when the tube is suspended from the cord the travel of the bubble can be observed for a considerable distance along the tube each side of its middle point.

Fifth, to provide in the holder, at the back of the tube suitable graduations that can be seen through the tube by an observer looking at the side of the instrument, said graduations being arranged so that the amount of inclination of the level can be observed when the level is not exactly horizontal.

By this arrangement it is possible to observe the tube from the side instead of from the top, as is customary in the use of ordinary spirit levels, and since the bubble in a spirit tube can be seen at a much greater distance when viewed from the side it follows that with this instrument the observer can secure accurate results in leveling, even when standing at a considerable distance from the level.

With these and certain other objects in view which will appear later in the specification, my invention comprises the devices described and claimed and the equivalents thereof.

In the drawings, Figure 1 is a side view of the spirit tube and the holder in which it is mounted.

Figure 4:
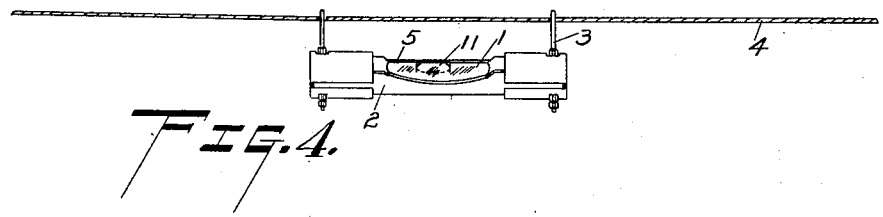
Fig. 4 is a side view showing the level in use.
Figure 5:
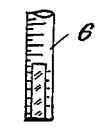
Fig. 5 is a perspective view of a preferred form of washer and of the lower end of the hanger shank to be received therein.

As is clearly shown in the drawings, the device consists in a leveling tube or spirit tube 1 mounted in any suitable manner in a holder 2 and adapted to be suspended by means of the eyes 3 or equivalent suspending devices, from a cord 4, which is adapted to be stretched between the two points, the relative elevations of which are to be observed.

Figure 1:
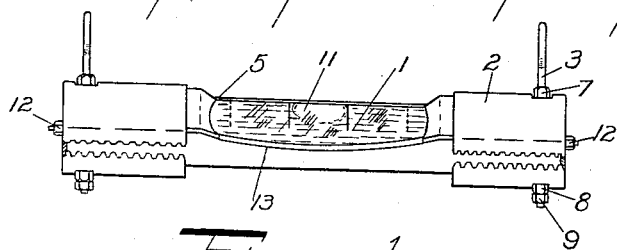

The holder 2 is formed with an elongated opening 5 to expose not only the upper surface of the tube 1, but also a relatively larger part of one side of the tube, as shown in Fig. 1, for a purpose that will presently be explained.

Figure 2:
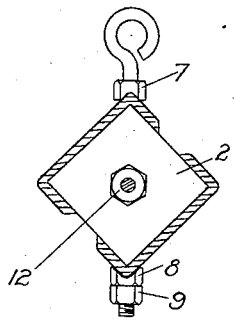
Fig. 2 is an enlarged sectional end view of the holder.
Figure 3:
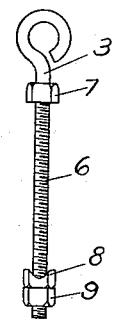
Fig. 3 is an enlarged detail of the suspending device.

Each eye 3 is preferably formed with a threaded shank 6, upon the upper end of which is a nut 7 and upon its lower end is a washer 8 and a nut 9. The washer 8 is preferably formed with a notch 10 to fit the lower corner of the holder 2, as shown in Fig. 2, and the threaded shank 6 preferably passes diagonally through the holder 2 from corner to corner.

When the level is suspended from the cord 4, the latter being horizontal, proper adjustment of the nuts 7 and 9 will bring the bubble 11 to its central position, as shown in Fig. 4.

In order that the level when suspended from the cord 4 may be hung truly horizontal, I provide means for counterbalancing the level. This is done by balancing the level on lathe centers located correctly with relation to the central position of the bubble, and then taking away from weights 12 at the heavy end. The weights are secured to the two ends of the holder 2, as shown in Fig. 1.

At the back of the tube 1, that is, at the side farthest from the observer, I preferably color the spirit tube 1, to provide a reflecting or refracting surface, and provide on the surface so formed marks or graduations 13, these marks being arranged so that a displacement of the bubble from its central position to any given mark will correspond to a predetermined inclination of the level. It will be noticed also, that the graduation marks are protected from injury, the holder 2 serving as a protector. When the center of the bubble coincides with the first mark to the left in Fig. 1, it will indicate an inclination of the cord 4 corresponding to a slope of, say, one inch in five feet. It is obvious, however, that any other desired calibration may be obtained by properly locating the graduations 13.

By the means above described, I have produced a simple, relatively inexpensive, compact leveling device of the class described that is capable not only of indicating horizontal positions with accuracy, but is also capable of indicating at a considerable distance, departures from the horizontal, not only as to their direction, whether up or down, but also the approximate amount of declination.

The instrument is also capable of being easily and quickly restored to adjustment if through accident it gets out of order, or requires readjustment after a new tube has been inserted to replace a broken one.

Having thus described my invention, what I claim and desire to secure by Letters Patent is:

In a level, the combination of a holder having a spirit tube therein, I-bolts, each bolt having a threaded shank and an adjusting nut near the upper end of the shank, an adjusting nut at the lower end of the shank, said nuts engaging the holder, a weight secured to each end of the holder, said weight adapted to be adjusted for the purpose of balancing the level.

In testimony whereof, I affix my signature in presence of two witnesses.

HERBERT G. ROUNDS.

Witnesses:
NELLIE M. ANGUS,
JOSEPH V. CARPENTER.